Aug. 17, 1965  A. H. WHITBREAD ETAL  3,200,683
POSITIONING DEVICE FOR ROTARY MACHINE TOOLS
Filed Sept. 11, 1961  3 Sheets-Sheet 1

INVENTORS
ALBERT HOWARD WHITBREAD
ROY SIDNEY DOLMAN
By: Norris & Bateman, Attys

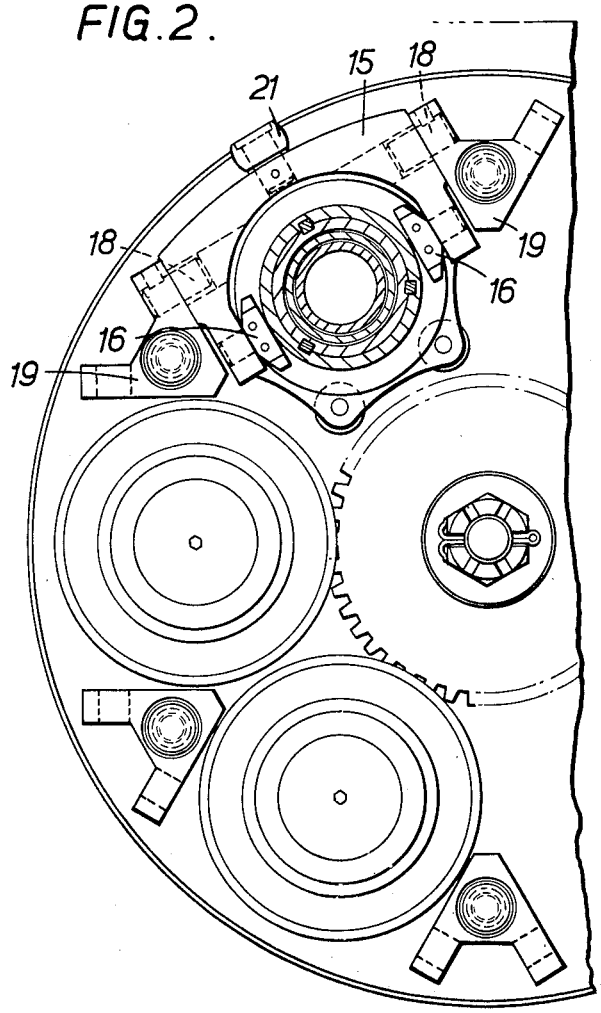

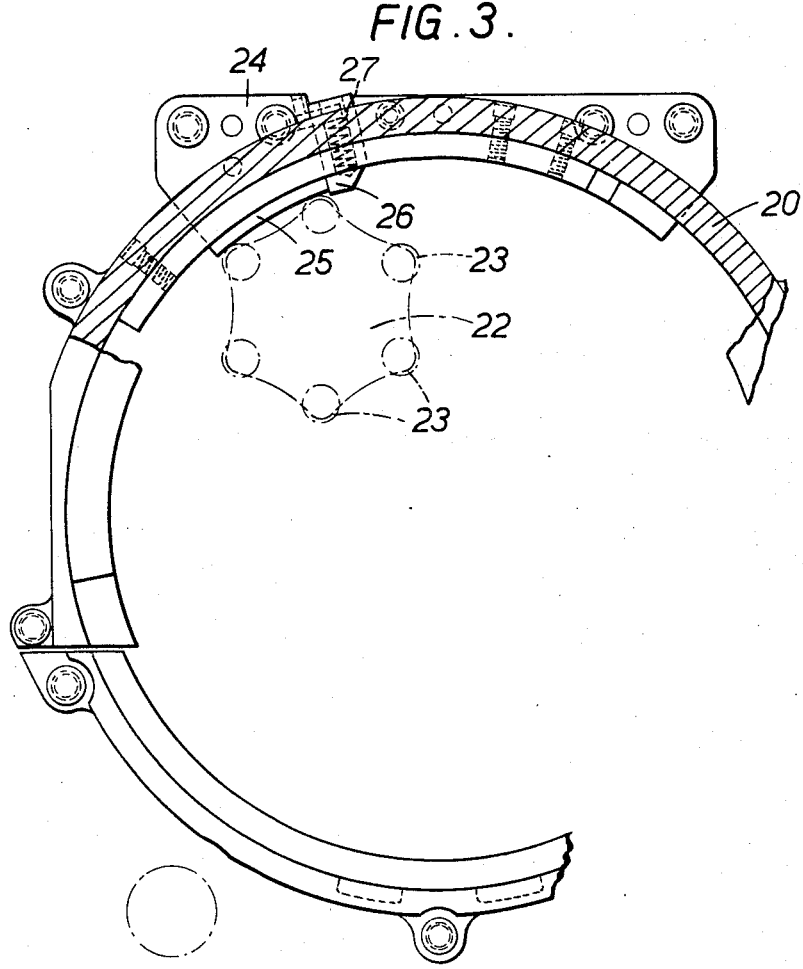

United States Patent Office 3,200,683
Patented Aug. 17, 1965

3,200,683
POSITIONING DEVICE FOR ROTARY MACHINE TOOLS
Albert Howard Whitbread and Roy Sidney Dolman, Ward End, Birmingham, England, assignors to Birmingham Small Arms Company Limited, Birmingham, England
Filed Sept. 11, 1961, Ser. No. 137,251
8 Claims. (Cl. 82—28)

This invention relates to means for bringing a rotatable part in a machine tool to a halt in a predetermined angular position, or in one of a limited number of predetermined possible positions.

In the machining of workpieces on a rotary machine tool, such as a turret lathe, it is frequently necessary to bring the workpiece to a halt in a predetermined angular position with respect to a tool that is to act upon it. For example, a lateral slot or radial hole may require to be cut or drilled at a predetermined angular position on the workpiece.

It is an aim of the present invention to provide means for achieving this object. According to the invention a positioning device for a rotatable part of a machine tool, such as a work-carrying spindle, comprises a cam surface designed to be mounted on the machine tool and a cam follower rotating with the spindle or other rotatable part, means being provided for allowing relative movement between the cam and cam follower until they engage one another, the cam and follower being shaped so that, on further relative movement in the same direction, the cam turns the follower and thereby causes the follower to turn the spindle and other rotatable part to a predetermined angular position.

Preferably the follower has two spaced parts for engaging the cam simultaneously when the spindle or other rotatable part is in the desired position, so that, by halting the relative movement between the cam and the follower when in such engagement, they will locate the spindle or other part positively.

The invention may be applied to single-spindle machines, in which the spindle rotates about a fixed axis, and in this case the cam would be mounted so as to be movable towards the rotating follower. More particularly, however, the invention is applicable to multi-spindle machines, in which a number of spindles are mounted in a rotary carrier which rotates about an axis parallel to those of the spindles to bring the spindles successively into line with the various working stations. In this case the cam would be mounted in a fixed position on the machine, and followers mounted on or associated with the spindles are brought successively into engagement with the cam as the carrier is indexed round. In such an arrangement the cam preferably has at least a part of concave part-cylindrical form, concentric with the axis of rotation of the carrier, so that two parts of the follower can engage it simultaneously, as mentioned above, to hold the spindle positively in the desired angular position.

The invention could also be applied, where the spindle is in a carrier that is displaced linearly in a direction perpendicular to the axis of rotation of the spindle. The stationary cam surface would then be straight and parallel to this direction of displacement.

The invention will now be described by way of example with reference to the accompanying drawings, in which:

FIGURE 2 is a partial elevation of the spindle carrier, looking from the right in FIGURE 1;

FIGURE 3 is a scrap view of the cam surfaces that actuate the mechanisms shown in FIGURES 1 and 2.

Figure 1:
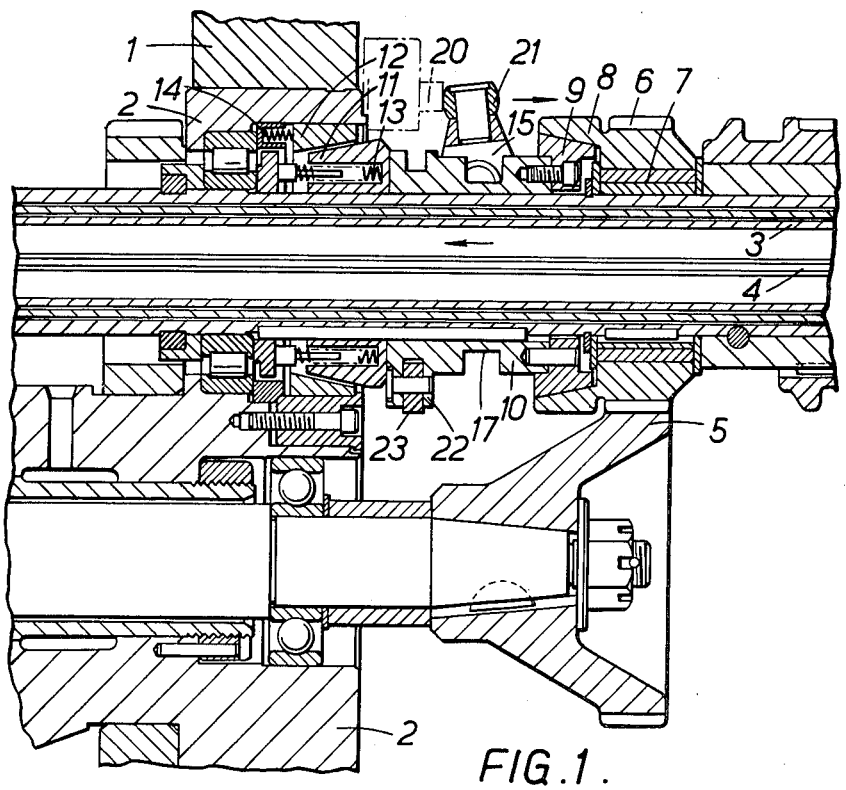
FIGURE 1 is a cross-section through the axis of the carrier of a multi-spindle automatic lathe, showing a portion of the spindle carrier and one of the spindles.

Referring first to FIGURES 1 and 2, a multi-spindle automatic lathe, of which the headstock is indicated at 1, has a carrier 2 with six spindles 3 mounted in it for rotation, the spindles being arranged symmetrically around the axis of the carrier 2. In a well-known manner the carrier is indexed round one sixth of a revolution at a time by means not shown, to bring workpieces held by the spindles successively to six different stations at each of which a machining operation is performed on them.

In the example under consideration, the workpiece is in the form of a hexagonal bar 4 which passes down the spindle 3 (which is hollow for this purpose) and is gripped by a chuck, not shown. At one of the stations it is necessary to perform an operation on the bar at a predetermined angular position, for example to drill the bar radially, at right angles to one of the six faces, although it is not important which of the six faces is drilled.

The spindles are rotated in a known manner through a spur gear 5, carried on a driving shaft coaxial with the carrier 2 and engaging spur gears 6 on each of the spindles. However, in the arrangement shown, the gears 6 are not secured to the spindles but are rotatably mounted on them on bearings 7. One member 8 of a cone clutch is formed integrally with the gear wheel 6 and the other member 9 is secured to a sleeve 10 which is axially movable on the spindle 3 but is keyed to it to prevent relative rotation. The other end of the sleeve carries a further cone member 11 co-operating with a non-rotating cone 12 mounted on the carrier 2 to form a brake. It will thus be seen that, by movement of the sleeve 10 to the right in FIGURE 1, the spindle 3 is coupled to the rotating gear wheel 6, and when the sleeve is moved to the left, the spindle is brought to a halt. Springs 13 normally urge the sleeve 10 to the right, and when it is moved to the left springs 14 allow the non-rotating cone 12 of the brake to yield resiliently, avoiding unduly heavy loading of the parts.

Movement of the sleeve 10 is controlled by a fork 15 provided with shows 16 (FIGURE 2) engaging in a groove 17 in the sleeve, the fork being pivoted by trunnions 18 in brackets 19 on the face of the carrier 2. An arcuate face cam 20 mounted on a fixed part of the machine and disposed concentrically with the carrier 2 engages a roller 21 on the outer end of the fork 15 as the carrier 2 rotates, so as to move the sleeve axially in a manner to be described later, as the associated spindle moves past it when the carrier is indexed round.

Figure 4:
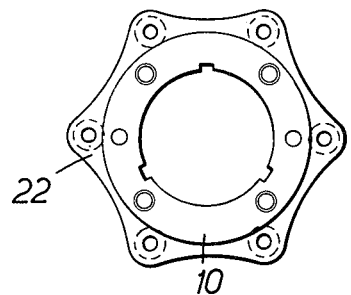
FIGURE 4 shows one of the cam followers, with its rollers omitted.

Integrally formed on the sleeve 10 is a cam follower or positioning wheel 22, of generally hexagonal shape (FIGURE 4) and provided with rollers 23 at its apices. As the carrier 2 rotates, the cam follower on the sleeve of that spindle which is approaching the station at which the radial drilling or other transverse machining operation is to be performed engages a stationary cam 24, FIGURE 3. This cam has a part-cylindrical surface 25, and its nose portion 26 can yield radially outwards against the action of a spring 27. Its leading edge is chamfered, and in its free position it stands proud of the remainder of the surface 25. It will be appreciated that, with the carrier rotating counter-clockwise as viewed in FIGURE 3, and with the cam follower or positioning wheel 22 in a random angular position and free to rotate, one of the rollers 23 will strike the nose portion 26 of the cam 24, which will yield and will at the same time turn the wheel 22 until one of its hexagonal faces is parallel with a tangent to the surface 25. When the carrier 2 halts with the associated spindle at the machining station, two of the rollers 23 are simultaneously in contact with the surface 25, as indicated in broken lines in FIGURE 3, thus locking the wheel 22 and the spindle 3 securely against rotation. Then when the carrier 2 is indexed round by a further one sixth of a revolution, the wheel 22 moves clear of the cam 24, and the corresponding wheel of the next spindle takes its place.

The purpose of the cam 20, referred to earlier, is to disengage the spindle 3 from its drive as it approaches the station in question. Normally, the springs 13 keep the clutch 8–9 engaged, but as each spindle approaches the radial drilling station the stationary face cam 20 is engaged by the roller 21 to move the sleeve 10 axially, disengaging the clutch and applying the brake 11–12 to halt rotation of the spindle, after which the sleeve is returned to an intermediate position, keeping both clutch and brake disengaged to allow free rotation of the spindle before the rollers on the wheel 22 strike the nose portion of the cam 24. Finally, as the spindle moves on to the next station on further rotation of the carrier 2, the roller 21 moves clear of the cam 20 and the springs 13 cause reengagement of the clutch 8–9 to drive the spindle again.

Where, as in the present example, the work is a hexagonal bar, the bore of the spindle 3 is provided with a diagphragm (not shown) having a hexagonal aperture (through which the work passes) with a predetermined angular relationship with the positioning wheel 22, so as to ensure that the work is always in the correct angular relationship with the wheel. Alternatively, the chuck that grips the work could be arranged to grip it only in the required angular position.

It will be appreciated that, while the invention has been described with reference to means for halting the work in any one of six angular positions, it may be used to halt it in one of any number of angular positions from three upwards. In a given machine it is only a matter of replacing the positioning wheel 22 with one of the appropriate shape.

We claim:

1. In a machine tool, a spindle carrier mounted for rotation about a first axis, a spindle supported on said carrier and being rotatable about a second axis in parallel spaced apart relationship to said first axis, a drive train for rotating said spindle, a cam follower having a polygonal periphery providing angularly spaced apart follower surface region, means non-rotatably mounting said cam follower on said spindle, fixedly mounted cam surface means engageable by adjacently disposed ones of said follower surface regions upon rotation of said carrier to a predetermined position and coacting with said follower surface regions to impart rotation of said spindle to a predetermined oriented position and to lock said spindle against rotation in said oriented position.

2. The machine tool defined in claim 1 wherein said cam surface means comprises a part cylindrical surface centered about said first axis.

3. The machine tool defined in claim 2 comprising releasable clutch means establishing a driving connection between said drive train and said spindle and means controlling actuation of said clutch means in predetermined relation to rotation of said carrier to effect disengagement of said drive train from said spindle whenever said follower approaches and said cam surface means.

4. The machine tool defined in claim 3 wherein said clutch means comprises a clutch shift collar, means non-rotatably mounting said collar for axial displacement on said spindle, and a cooperating clutch element disposed on said drive train and engageably by said collar.

5. The machine defined in claim 4 wherein said means controlling actuation of said clutch means comprises fixed cam and movable follower means operable to shift said collar into and out of engagement with said clutch element in response to rotation of said carrier.

6. The machine tool defined in claim 5 comprising brake means cooperating with said collar and effective when said collar is shifted to a predetermined position out of engagement with said clutch element to retard rotation of said spindle.

7. The machine defined in claim 6 wherein said fixed cam and movable follower means is operable to shift said collar to a position for releasing said brake means while maintaining the disconnection between said drive train and said spindle for a sufficient predetermined angular displacement of said carrier to permit said spindle to be free for rotation to said oriented position upon engagement of said follower with said cam surface means.

8. In a machine tool having at least one work station, a rotatable spindle and drive means for rotating said spindle, the improvement comprising cam surface means fixed at said station, follower means non-rotatably mounted on said spindle, means for bodily and unitarily displacing said spindle and said follower means in a predetermined direction to engage said follower means with said cam surface means, said cam surface means coacting with said follower means to angularly orient and lock said spindle against rotation, said cam surface means comprising an arcuate surface uniformly curved about an axis substantially parallel to the rotational axis of said spindle and said follower means being provided with a polygonal periphery having a plurality of angularly spaced apart follower corners disposed radially outwardly of said spindle and engaging said arcuate surface in said oriented position.

References Cited by the Examiner

UNITED STATES PATENTS

| 1,574,631 | 2/26 | Mirfield | 29—38 |
| 2,140,019 | 12/38 | Lewis | 82—28.2 X |
| 2,191,137 | 2/40 | Trible | 82—28 |
| 2,646,152 | 7/53 | Retz | 82—28 X |
| 2,907,434 | 10/59 | Wenzel | 82—28 X |
| 2,957,566 | 10/60 | Brown | 82—28.2 X |

ANDREW R. JUHASZ, *Primary Examiner.*

RICHARD H. EANES, JR., *Examiner.*